US008454149B2

(12) United States Patent
Lambright et al.

(10) Patent No.: US 8,454,149 B2
(45) Date of Patent: Jun. 4, 2013

(54) THERMAL INKJET PRINT HEAD WITH SOLVENT RESISTANCE

(75) Inventors: Terry M. Lambright, Corvallis, OR (US); Anthony Selmeczy, West Chicago, IL (US); Francis Chee-Shuen Lee, Hsin-chu (TW); Charles C. Haluzak, Philomath, OR (US); Kenneth E. Trueba, Corvallis, OR (US)

(73) Assignee: Videojet Technologies Inc

( * ) Notice: Subject to any disclaimer, the term of this patent is extended or adjusted under 35 U.S.C. 154(b) by 223 days.

(21) Appl. No.: 12/824,424

(22) Filed: Jun. 28, 2010

(65) Prior Publication Data

US 2010/0328398 A1 Dec. 30, 2010

Related U.S. Application Data

(60) Provisional application No. 61/221,439, filed on Jun. 29, 2009.

(51) Int. Cl.
*G01D 11/00* (2006.01)

(52) U.S. Cl.
USPC .............................................. 347/100; 347/47

(58) Field of Classification Search
USPC ...................... 347/47, 14, 40, 43, 95, 96, 100
See application file for complete search history.

(56) References Cited

U.S. PATENT DOCUMENTS 4,794,410 A 12/1988 Taub
4,882,595 A 11/1989 Trueba
4,944,850 A 7/1990 Dion
4,953,287 A 9/1990 West
4,989,317 A 2/1991 Firl
5,122,812 A 6/1992 Hess
5,291,226 A 3/1994 Schantz
5,748,209 A 5/1998 Chapman
5,774,148 A 6/1998 Cornell
5,859,655 A 1/1999 Gelorme
5,907,333 A 5/1999 Patil
6,045,214 A 4/2000 Murthy
6,155,674 A * 12/2000 Figueredo et al. .............. 347/63
6,161,923 A 12/2000 Pidwerbecki
6,179,413 B1 1/2001 Coulman
6,371,600 B1 4/2002 Murthy
6,386,679 B1 * 5/2002 Yang et al. ...................... 347/45

(Continued)

OTHER PUBLICATIONS

Koukharenko, Kraft, Ensell, Hollinshead, "A comparative study of different thick photoresists for MEMS applications," Journal of Materials Science: Materials in Electronics, 2005, p. 741-747, vol. 16, Springer Science + Business Media, Inc.

(Continued)

*Primary Examiner* — Lamson Nguyen
(74) *Attorney, Agent, or Firm* — Joseph A. Yosick

(57) ABSTRACT

An inkjet printing system includes a print head in fluid communication with an ink reservoir and having a plurality of orifices and a corresponding plurality of associated ejection chambers. The print head includes a substrate and a barrier layer disposed on the substrate. The barrier layer defines in part a plurality of fluid channels and the plurality of ejection chambers. The barrier layer includes a material selected from epoxy-based photo resist materials and methyl methacrylate-based photo resist materials. An orifice plate is disposed over the substrate. The orifice plate includes the plurality of orifices in fluid communication with the ejection chambers. The orifice plate comprises a material selected from polyimides and nickel.

21 Claims, 6 Drawing Sheets

U.S. PATENT DOCUMENTS

| | | | | |
|---|---|---|---|---|
| 6,648,732 | B2 | 11/2003 | Pugliese | |
| 6,757,973 | B2 | 7/2004 | Park | |
| 7,240,991 | B2 * | 7/2007 | Timm et al. | 347/50 |
| 2003/0052947 | A1 | 3/2003 | Lin | |
| 2003/0085951 | A1 * | 5/2003 | Keenan et al. | 347/44 |
| 2003/0087199 | A1 | 5/2003 | Kim | |
| 2006/0061629 | A1 * | 3/2006 | Park et al. | 347/61 |
| 2006/0238576 | A1 | 10/2006 | Lee | |

OTHER PUBLICATIONS

Microchem, Material Safety Data Sheet for SU-8 3000 Series Resists, Aug. 29, 2006.

* cited by examiner

THERMAL INKJET PRINT HEAD WITH SOLVENT RESISTANCE

CROSS REFERENCE TO RELATED APPLICATIONS

This application claim priority to U.S. Provisional Application No. 61/221,439 filed Jun. 29, 2009, and incorporated herein by reference in its entirety.

BACKGROUND OF THE INVENTION

This invention relates generally to thermal inkjet print heads. More particularly, the invention pertains to a thermal inkjet print head with resistance to organic solvents.

A known structure for interconnecting a thermal inkjet print head and its electrical components to a printing system controller is a tape automated bonded (TAB) interconnect circuit. TAB interconnect circuits used with thermal inkjet print heads are disclosed in U.S. Pat. Nos. 4,989,317; 4,944,850 and 5,748,209. A TAB circuit may be fabricated using a flexible polyimide substrate for supporting a metal conductor such as a gold plated copper. Known fabrication methods such as the "two layered process" or the "three layered process" may be used to create the components including device windows, contact pads and inner leads, for the TAB conductor circuit. In addition, a die-cut insulating film is applied to the conductor side of the TAB circuit to isolate the contact pads and traces from a cartridge housing on which the TAB circuit is affixed.

The print head is affixed to the TAB circuit in spaced relation to the contact pads, and the traces provide an electrical connection between the contact pads and the print head electrical components. When the TAB circuit, including the print head, is affixed to an inkjet cartridge, the print head portion of the TAB circuit is affixed to one side of the cartridge in fluid communication with an ink supply. That portion of the TAB having the contact pads is affixed to an adjacent side of the cartridge housing that is typically disposed perpendicular to the side of the cartridge housing to which the print head is attached. The contact pads are positioned on the cartridge housing for alignment with electrical leads on the printing system thereby electrically interconnecting the print head with a printing system controller to carry out print commands.

A typical thermal inkjet print head is essentially a silicon chip/substrate with thin-film structures such as an array of resistive heaters and corresponding transistors that switch the power pulses to the heaters. The print head may also include other components such as an identification circuit that provides coding information of print head characteristics and an electrostatic discharge component or electronic logics for multiplexing the firing of the heaters. After forming the film structures and circuits on the chip, an ink barrier layer is formed over the thin-film structures and etched or is otherwise treated to create a plurality of ink flow channels and ink chambers. Known ink flow channel and ink chamber architectures are disclosed in U.S. Pat. Nos. 4,794,410 and 4,882,595. In addition, an ink slot is formed by cutting a slot through a middle portion of the print head using known cutting techniques such as sand-blasting. This slot completes an ink flow network and places the print head in fluid communication with an ink supply.

A nozzle plate having a plurality of orifices is bonded to the ink barrier layer whereby each orifice is aligned with a corresponding ink chamber; and, for each ink chamber there is an associated heater and transistor. When power pulses are transmitted in accordance with print commands to the print head, the resistive heaters heat the ink in the ink chamber to create one or more pressure bubbles in the chamber that forces ink to eject in droplet form through respective orifices onto a print medium.

The resistive heaters and corresponding orifices in the nozzle plates have been arranged in at least two columns or rows depending on the orientation of the print head. The heaters and nozzles in a single row are offset relative to one another, and each of the columns is vertically or horizontally offset relative to one another. This type of arrangement of heaters and nozzles is used to minimize cross-talk between the heaters in a column, which may cause misfiring of ink drops. Multiplex drive circuits have been provided to control firing timing so that adjacent heaters in a column are not simultaneously fired to minimize cross-talking between fired heaters. Multiplexing may also reduce the number of signal lines in a circuit and the area required to complete the circuits, which area becomes a premium due to the crowding from other electrical components on a flex circuit.

BRIEF DESCRIPTION OF THE INVENTION

Embodiments of an inkjet printing system comprise a print head in fluid communication with an ink reservoir. The print head includes a plurality of nozzles and a plurality of associated ink ejection chambers, each of the chambers being associated with a respective one of a plurality of transistor drivers controlling a corresponding heater. In response to print command signals the heater is activated and ejects ink drops from the chamber and through the nozzles onto a print medium. A controller in electrical communication with the print head generates the print command signals which identify the transistor drivers and heaters to be activated and a sequence for activating the transistor drivers and heaters relative to one another for completing a printing operation.

In an embodiment, an inkjet printing system includes a print head in fluid communication with an ink reservoir and having a plurality of orifices and a corresponding plurality of associated ejection chambers. The print head includes a substrate and a barrier layer disposed on the substrate. The barrier layer defines in part a plurality of fluid channels and the plurality of ejection chambers. The barrier layer includes a material selected from epoxy-based photo resist materials and methyl methacrylate-based photo resist materials. An orifice plate is disposed over the substrate. The orifice plate includes the plurality of orifices in fluid communication with the ejection chambers. The orifice plate comprises a material selected from polyimides and nickel.

The print head may be affixed to an end of a tape automated bonded (TAB) flex circuit having an electrical interconnection thereon distal to the print head. In an embodiment, the TAB flex circuit is mounted on a snout of an inkjet print cartridge and the electrical interconnection is disposed at acute angle relative to the print head.

BRIEF DESCRIPTION OF THE DRAWINGS

A more particular description of the invention briefly described above will be rendered by reference to specific embodiments thereof that are illustrated in the appended drawings. Understanding that these drawings depict only typical embodiments of the invention and are not therefore to be considered to be limiting of its scope, the invention will be described and explained with additional specificity and detail through the use of the accompanying drawings.

DETAILED DESCRIPTION OF THE INVENTION

Figures 1, 9A, 9B:
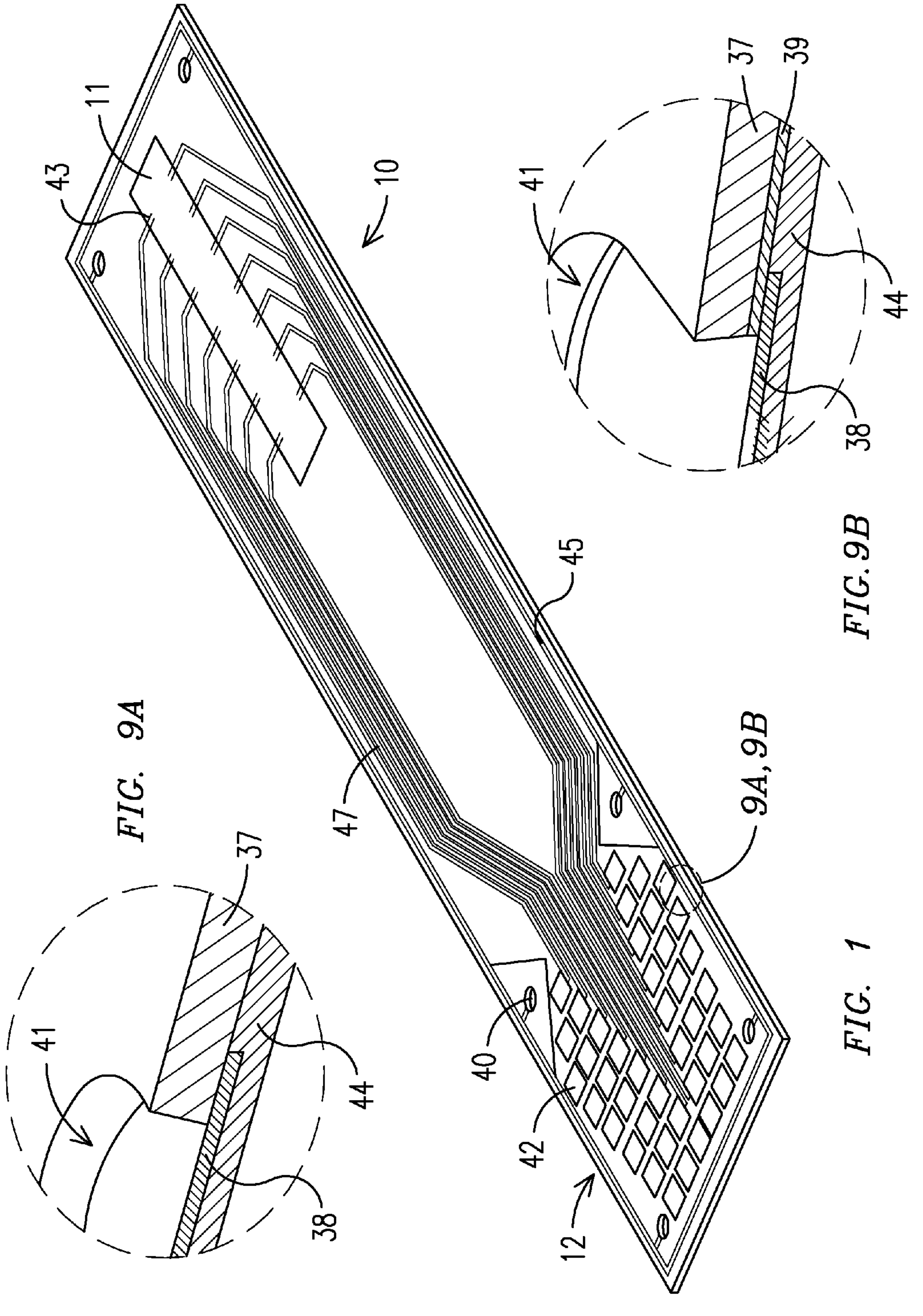
FIG. 1 is a schematic perspective view of a tape automated bonding (TAB) flex circuit.
FIG. 9A is a sectional view of an electrical interconnection for an embodiment of the invention.
FIG. 9B is a sectional view of an electrical interconnection for another embodiment of the invention.

Reference will now be made in detail to the embodiments consistent with the invention, examples of which are illustrated in the accompanying drawings. Wherever possible, the same reference numerals are used throughout the drawings and refer to the same or like parts. While the invention is described below in reference to a thermal inkjet printer, the invention is not so limited and may be incorporated into other inkjet printing systems that utilize other technologies, such as piezo-transducers to eject ink. The term "nozzle" as used herein shall mean the orifices formed in a print head cover plate through which ink is ejected and/or shall also include such orifices and other components of the print head such as an ejection chamber from which the ink is ejected. In addition, the described system and method for an inkjet printing system is not limited to applications with a print head assembly mounted to a cartridge housing, which may or may not be a disposable cartridge. The present invention may be used with print heads permanently mounted in printing systems and an ink supply is provided as necessary for printing. So the term cartridge may include a permanently mounted print head only and/or the combination of the print head with the ink source.

The present disclosure relates to a thermal inkjet print head composed of materials that offer resistance to solvent-based inks. In particular, the print head components include materials and surface treatments that provide a print head assembly that does not significantly dissolve, delaminate, shrink swell, or otherwise distort when exposed to strong solvents for months or years. In particular, the system is preferably capable of storing an organic solvent-based ink for a period of at least six months, preferably at least 12 months, while maintaining full functionality of the printing system. The system is also preferably capable of printing an organic solvent-based ink for a period of at least three months of use, while maintaining full functionality. Preferably, the use of an organic solvent-based ink does not cause any dissolving, delaminating, shrinking, or swelling of the print head materials that materially affects the printing performance of the system over the specified time periods. Organic solvents that are contemplated for use with the printing system include ketones, especially methyl-ethyl ketone, acetone, and cyclohexanone; alcohols, especially ethanol; esters; ethers; polar aprotic solvents, and combinations thereof.

Figure 2:
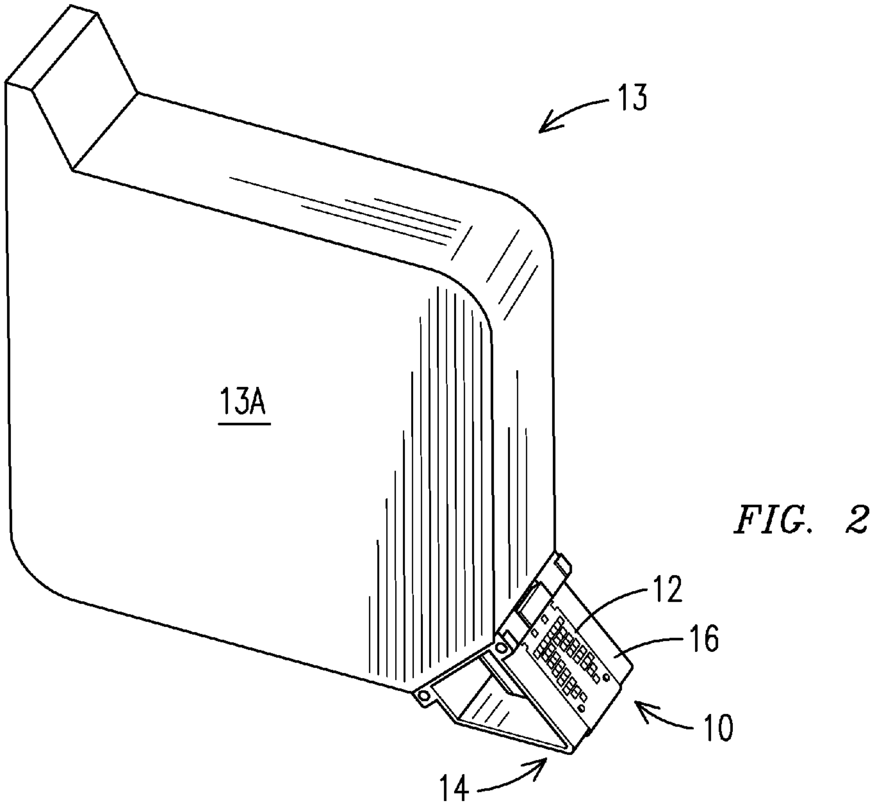
FIG. 2 is a perspective view of a print cartridge with the TAB flex circuit mounted thereon showing an electrical interconnection for the TAB flex circuit.
Figure 3:
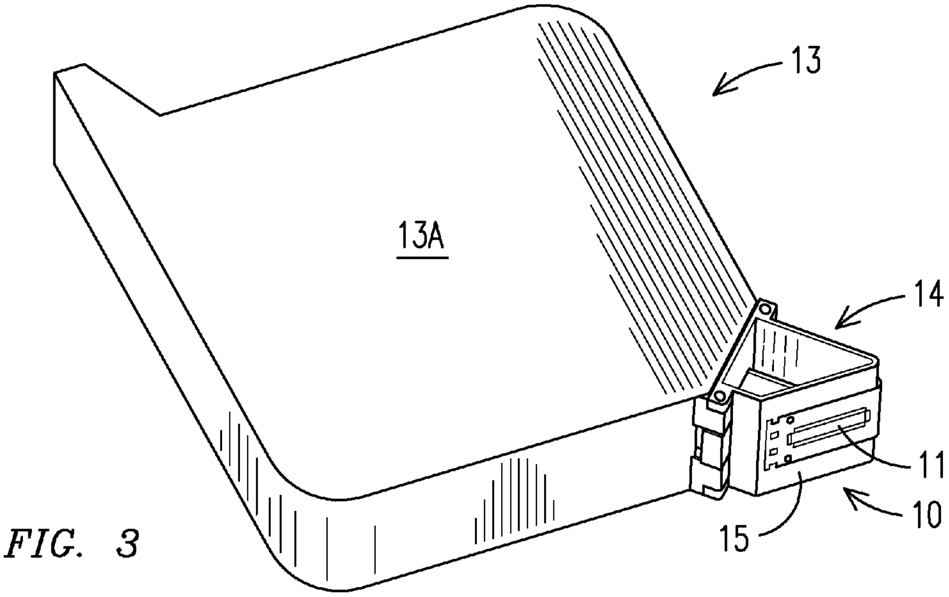
FIG. 3 is a perspective view of a print cartridge with the TAB flex circuit mounted thereon showing a print head for the TAB flex circuit.

The thermal inkjet print head may incorporate a tape automated bonding (TAB) flex circuit. With respect to FIG. 1 there is shown a TAB flex circuit 10 that includes a print head 11 on an end of the flex circuit 10 and a distal electrical interconnection 12 for electrical connection with a printing system. The TAB flex circuit 10, including the print head 11 and electrical interconnection 12, is preferably mounted to an inkjet cartridge 13 as shown in FIGS. 2 and 3. The cartridge 13 includes a snout portion 14 on which the print head 11 and electrical interconnection 12 are mounted. In the embodiment shown in FIGS. 2 and 3, the snout 14 may have a first surface 15 on which the print head 11 is affixed and a second surface 16 on which the electrical interconnection 12 is affixed wherein electrical interconnection 12 is disposed at acute angle relative to the print head 11. The TAB flex circuit 10, as explained in more detail below, is preferably a two-layer system including a film substrate supporting electrical contact pads 42 for electrical connection to a print controller (not shown), as well as traces 47 and inner leads 43 that provide electrical connection from the contact pads 42 to the print head 11.

With respect to FIGS. 4, 5, 6 and 7 there are illustrated schematic layouts and sectional views of the print head 11. The print head 11 comprises a silicon chip substrate 14 having formed thereon thin film structures 46 which provide an array of resistive heaters 18 and corresponding NMOS drivers 19 that switch power pulses to the resistive heaters 18. An ink slot 20 is centered on the print head 11 to supply ink from a bulk ink source secured in the cartridge housing 13A to a plurality of firing chambers 21 via fluidic channels 22. As explained below in more detail an ink barrier layer 35 is formed on the thin film structures 46 and etched to form a fluidic network that includes the fluidic channels 22 and firing chambers 21. A nozzle plate 23 is bonded to the ink barrier layer 35 and includes a plurality of nozzles 24 wherein each nozzle 24 is associated with a firing chamber 21 for ejecting ink in droplet form in response to print commands from the printing system controller that is not shown.

Figure 4:
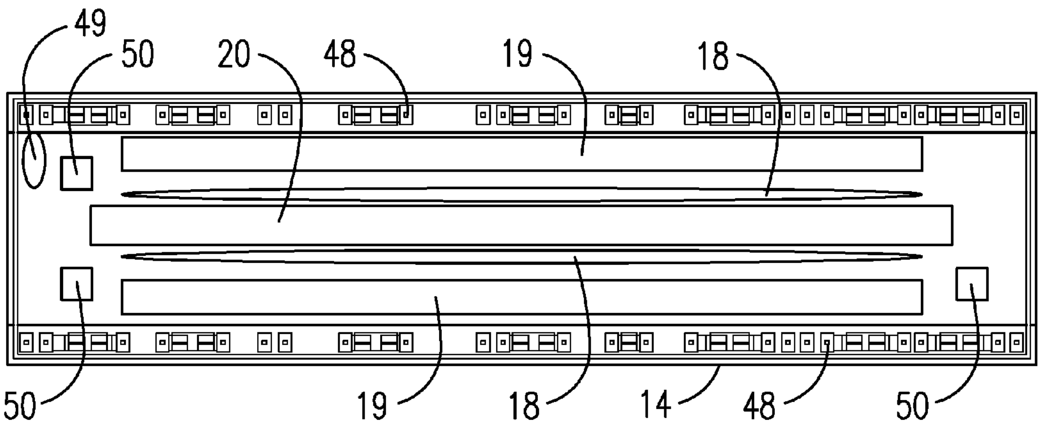
FIG. 4 is schematic circuit layout for the print head used with the TAB flex circuit.

With reference to FIG. 4, the above identified inner leads 43 (FIG. 1) are connected to bonding pads 48 that are disposed along a perimeter of the print head 11. In addition, an identification circuit 49 may be provided on the print head 11 to mark coding information relating to print head characteristics. Also, substrate heaters 50 may be provided to preheat the ink prior to initiating a printing operation.

Figure 8:
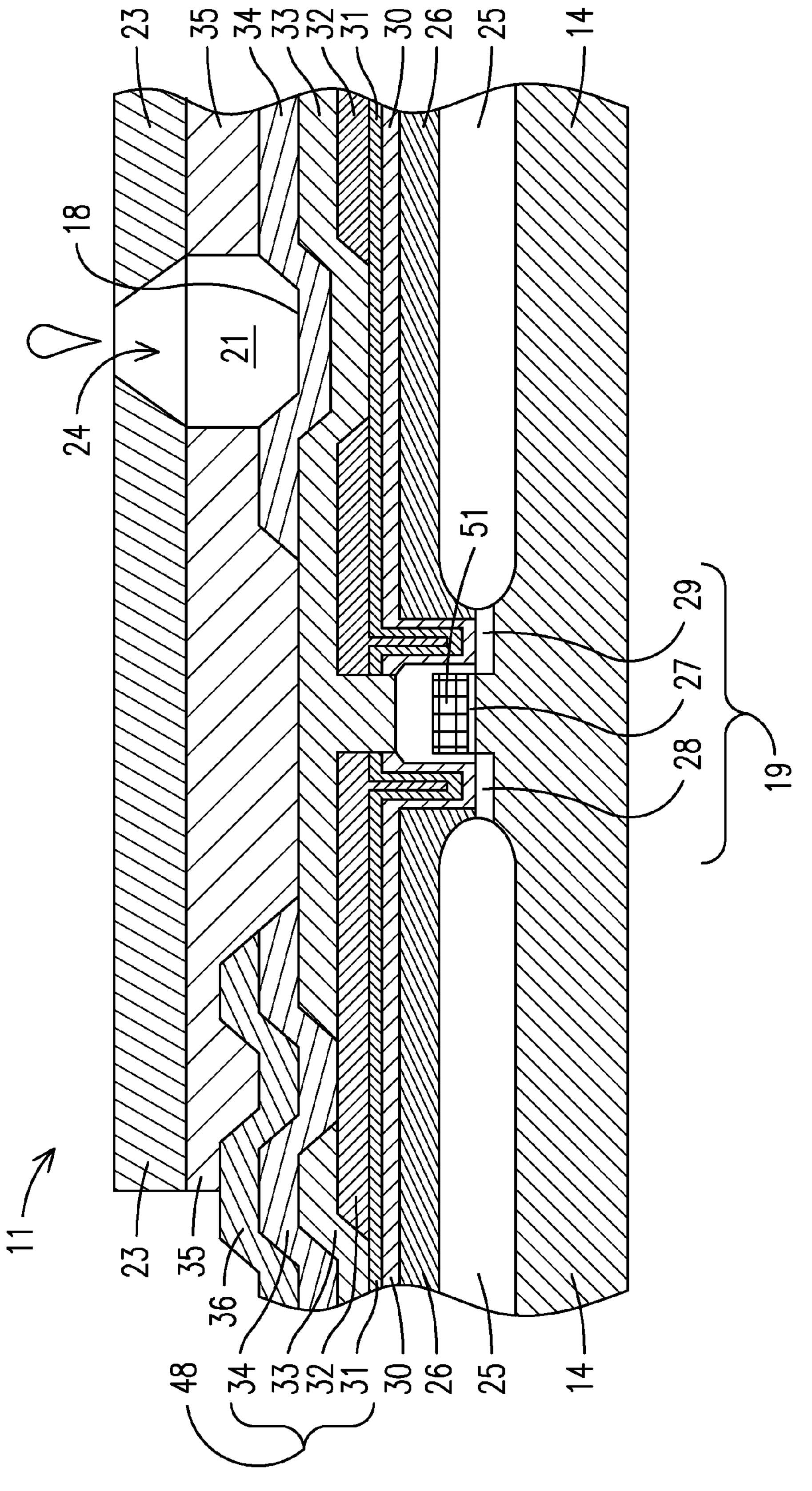
FIG. 8 is an elevational sectional schematic illustration of the print head showing the circuit components and layers for the print head.

A sectional view of the print head 11 is shown in FIG. 8, and provides a more detailed illustration of the thin film semiconductor devices of the print head 11 including the drivers/transistors 19 and resistive heaters 18. The semiconductor devices and electronic circuits are fabricated on the silicon chip substrate 14 using vacuum deposition techniques and photolithography. The chip substrate 14 is preferably an n-type silicon wafer. A patterned field oxide layer 25 comprising silicon dioxide is applied on the chip 14 surface outside the regions to be occupied by the transistors 19 comprising a drain 28, source 29 and gate region 27. The layer 25 may be formed by thermally growing the silicon dioxide by wet oxide or chemical vapor deposition (CVD). In addition, an oxide layer and poly-silicon conductors 51 are formed on top of the gate regions 27 of the transistors 19. An inner-layer dielectric 26, including multiple layers of oxide films such as a low pressure chemical vapor deposition oxide layer, a chemical vapor deposition oxide layer, a phosphosilicate glass layer and a borophosphosilicate glass ("BPSG") layer, is deposited over all regions of the substrate 14 with the exception of source 29 and drain 28 areas of the transistors 19.

U.S. Pat. No. 5,774,148 discloses an inner-layer dielectric having a BPSG on top of a CVD oxide; however, BPSG is known to be prone to thermal shock fatigue. In addition, the processing tools and fabrication processes require special attention. In the print head 11 of the subject invention, an additional oxide layer is deposited, using plasma-enhanced or low pressure chemical vapor pressure processes, on top of the BPSG. This additional oxide layer is more resistant to thermal stresses as compared to BPSG. A similar structure is disclosed in a United States patent application Publication No. U.S. 20060238576 A1.

The resistive heaters 18 are fabricated on top of the NMOS drivers or transistors 19. The resistive heaters 18 include a thermal barrier layer 30, a resistive film 31, a conductor layer 32, a passivation layer 33, a cavitation protective layer 34 and a layer 36 of Au on top forming the bonding pads 48. The barrier layer 30 comprises a TiN film deposited over the ILD layer 26. The resistive film 31 preferably comprises a layer of TaAl deposited over the TiN barrier layer 30; and, the conductor 32 preferably comprises a film of AlCu that is deposited over the TaAl resistive film 31. The TiN barrier layer 30, the resistive film 31 and conductor 32 are deposited using sputter deposition processes and then etched by lithography according to a predetermined design of print head 11. Then the three TiN barrier layer 30, TaAl resistive film 31 and conductor 32 are photo-lithographically patterned together in the same masking step so the TiN barrier layer is disposed between the ILD layer 26 and TaAl resistive film 31 and extends entirely underneath the TaAl resistive film 31. In addition, the TiN barrier layer is in direct contact with the sources 27 and drains 28 of the transistors 19.

The disposition of the TaAl resistive film 31 relative to the sources 27 and drains 28 of the transistors 19 is different than the configuration disclosed in U.S. Pat. No. 5,122,812, which discloses a resistive film in direct contact with the transistor components. In the present invention, the TiN barrier film 30 extends under all areas of the TaAl resistive film so the resistive film 31 is not in contact with or is not deposited on the transistor 19 components. Moreover, the TiN barrier layer 30 serves as a thermal-shock barrier layer underneath the resistive film 31 which serves as the heater for the firing chamber 18. The TiN barrier 30 has a higher electrical sheet resistance than that of the resistive film 31 to ensure that most of the electrical pulse power is directed through the resistive film 31. In addition, the TiN barrier film 30 has a higher thermal conductivity as compared to the ILD layer 26; therefore, the TiN barrier 30 serves as a heat diffusing layer for the heat generated by it and the resistive film 31 during firing.

Heater areas, over which the firing chambers 21 are disposed, are exposed by locally dissolving the AlCu conductor 32 on top of the TaAl resistive film 31 using wet etching processes which allow conductor 32 to be tapered at the junction of the TaAl resistive film 30 as shown in FIG. 8. The passivation layer 33 including a layer of silicon nitride and silicon carbide are deposited preferably by PECVD on top of the conductor 32. Then the cavitation layer 34 that comprises a layer of tantalum (Ta) is deposited over the passivation layer 33 preferably by sputter deposition.

As described above, an ink flow network includes an ink slot 20 and fluidic channels 22 to direct ink from a bulk source to the firing chambers 21. An ink barrier layer 35 is formed over the NMOS drivers or transistors 19 and resistive heaters 18. For use with strong organic solvents typically used in high-performance industrial inks such as ketones, especially methyl-ethyl ketone, acetone, and cyclohexanone; alcohols, especially ethanol; esters; ethers; polar aprotic solvents, and combinations thereof, an epoxy/novolac-based or methyl methacrylate-based negative photo resist may be used. An example of an epoxy/novolac-based photo resist is SU-8 3000 BX, manufactured by MicroChem Corporation. Another example of an epoxy/novolac-based photo resist is PerMX 3000, manufactured by DuPont. An example of a methyl methacrylate-based photo resist is Ordyl PR100 acrylic dry film, manufactured by Toyko Ohka Kogyo. The ink barrier layer 35 is laminated over the entire die surface, including the transistors 19, resistive heaters 18, fluidic channels 22, and ink slot 20. A mask with an ink flow network including the fluidic channels 22 and firing chambers 21 is provided and the photoresist is exposed to an ultraviolet light source through the mask. The level of irradiation may vary according to the type of material used for the barrier layer 35. For example, the level of irradiation used for the SU-8 3000 photo resist may range from about 150 mJ to about 250 mJ. The level of irradiation used for the PerMX 3000 photo resist may range from about 300 mJ to about 500 mJ. The level of irradiation used for the PR100 photo resist may range from about 65 mJ to about 200 mJ. After irradiation, the barrier layer 35 and fluidic architecture is developed in a high pressure wash step using a solvent the removes the unexposed polymer, leaving the desired structure.

The thickness of the ink barrier layer 35 and dimensions of the firing chambers 21 and fluidic channels 22 may vary according to printing demands. With respect to FIGS. 6 and 7 there is illustrated a representative fluidic channel 22 and firing chamber 21 having a three wall 21A configuration similar to that disclosed in expired U.S. Pat. No. 4,794,410. In a preferred embodiment, the edges of the resistive heaters 18 are spaced about 25 μm or less from the walls 21A of the firing chambers 21.

Figure 10:
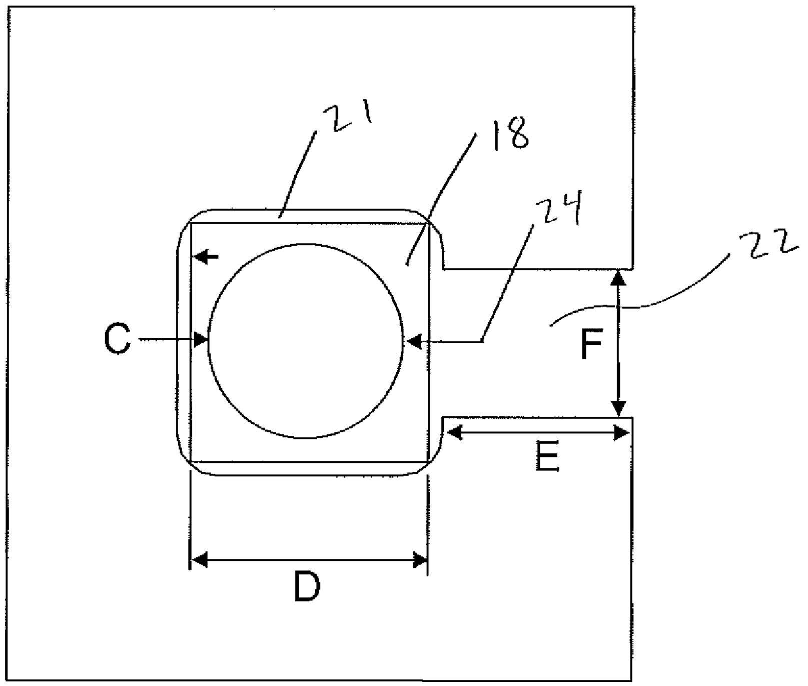
FIG. 10 is a top view of an embodiment of an ejection chamber.
Figure 11:
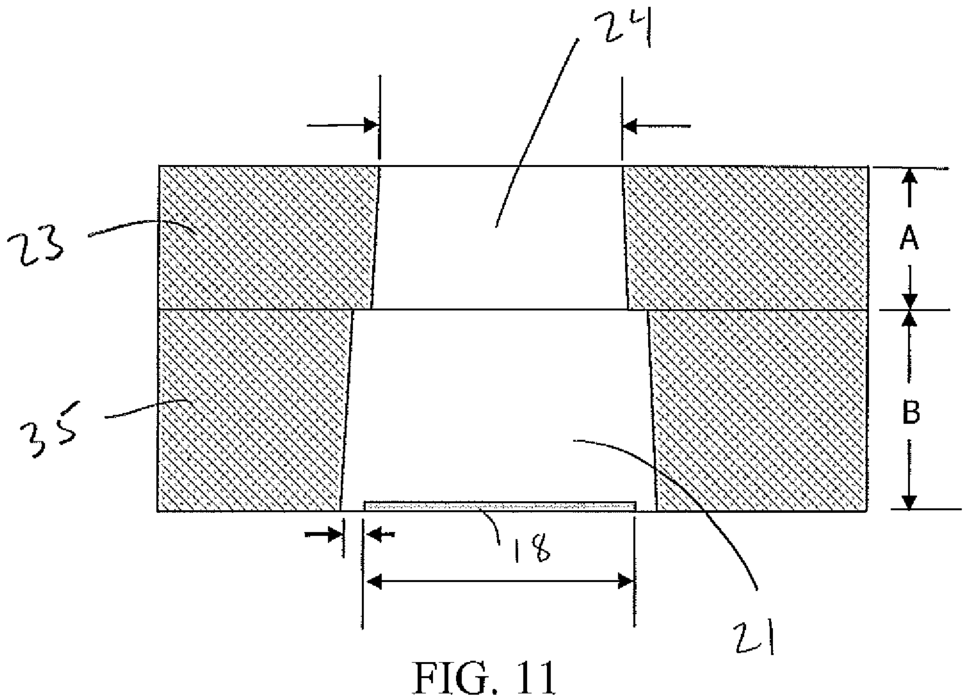
FIG. 11 is a side view of the ejection chamber of FIG. 10.

FIGS. 10 and 11 illustrate another representative fluidic channel 22 and firing chamber 21. The architecture of the barrier layer 35 defines the features that route the ink from the ink slot 20 to the firing chamber 21. The barrier layer 35 dimensions should be selected to enable optimal operating parameters such as operating frequency and print quality at the specified range of throw distance. In a preferred embodiment, the orifice plate 23 has a thickness A of about 50 μm; the ink barrier layer 35 has a thickness B of about 35 μm; the orifice 24 has a diameter C of about 35 to 45 μm, preferably 38 to 42 μm; the resistor has a length D of between 65 μm and 75 μm, preferably between 68 μm and 73 μm; the fluidic channels 22 have length E of about 30 μm and a width F of about 50 μm; and the chambers 21 may be about 50 μm×50 μm to about 80 μm×80 μm.

Due to the different properties of organic solvent-based inks compared to aqueous inks, it has been found that a different fluid architecture should be used for solvent-based inks than is used for aqueous inks. In particular, solvent based inks produce smaller bubbles than aqueous inks. To increase the bubble size and velocity, a larger resistor 18 may be used than is used for aqueous inks. In particular, the ratio of the resistor length to the orifice diameter is larger than that used for aqueous inks. The ratio of resistor length D to orifice diameter C is preferably between 1.7 and 2.1.

The previously described photolithography steps applied to substrate 14 are used to form an opening in the temporary photoresist layer with predetermined dimensions of the ink slot 20, and thus exposing the substrate 14. The exposed areas intended for the ink slot 20 are rid of any films before the sand-blasting step for forming the ink slot 20. The substrate 14 is then sand-blasted one side at a time to form the ink slot 20 using an X-Y scanning sand-blasting machine. This step is different than the technique disclosed in U.S. Pat. No. 6,648,732, which discloses a procedure that includes a plurality of thin film layers formed on a chip substrate and the ink slot is formed through the plurality of thin film layers in the ink slot area to prevent chipping during the grit-blasting procedure. According to embodiments of the present invention, films forming the resistive heaters 18 and transistors 19 are removed from the area intended for the ink slot 20, so the chip substrate 14 is directly exposed to the sand-blasting.

The ink slot 20 may be formed using a two-sided sand-blasting process. After, the resistive heaters 18 and transistors 19 are formed and etched as described above, the ink slot 20 is formed through the chip substrate 14. A single photosensitive thick film or photoresist is laminated on both sides of the wafer or chip substrate 17. This process is different than a technique disclosed in U.S. Pat. No. 6,757,973 which discloses a technique that incorporates a dual photo-resist layer.

Figure 5:
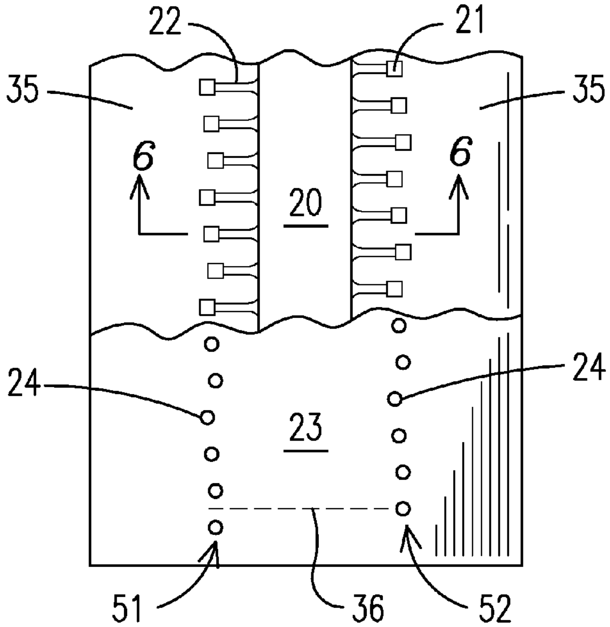
FIG. 5 is an elevational partial schematic view of the print head having an ink slot, ink fluidic channels, ejection chambers and a nozzle plate with nozzles.
Figure 6:
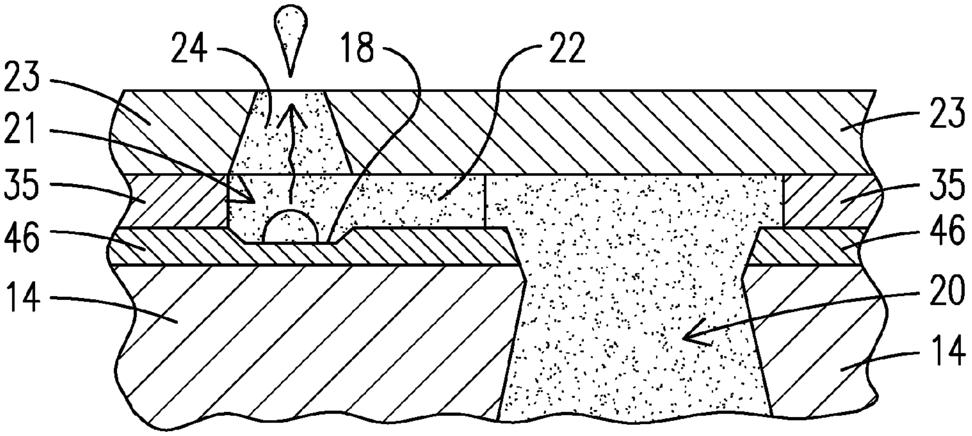
FIG. 6 is a sectional view of the print head taken along line 6-6 in FIG. 5.
Figure 7:
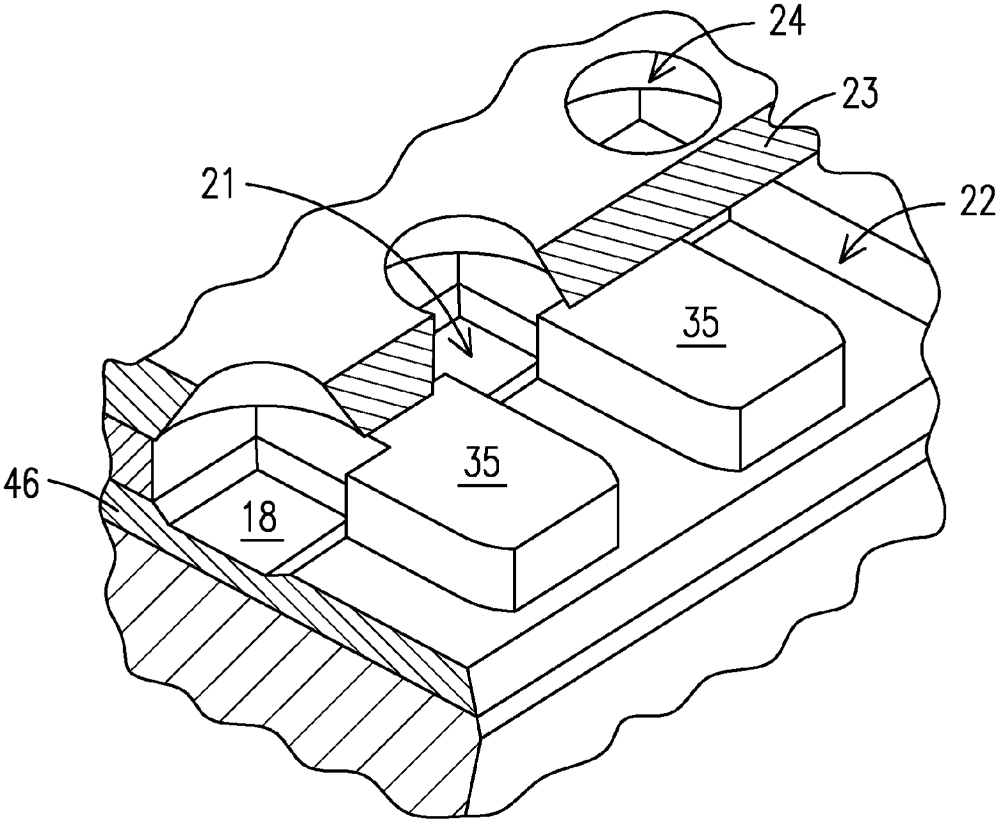
FIG. 7 is a perspective partial sectional view of the print head.

The nozzle plate 23 and arrangement of nozzles 24 is discussed in reference to FIGS. 5, 6 and 7. A polyimide nozzle plate 23 having an array of nozzles 24 (also referred to as “orifices” or “nozzle orifices”), and as described above, is mechanically and chemically bonded to the ink barrier layer 35 using a thermal bonding step. The surface of the nozzle plate may be treated to physically and/or chemically modify such smooth, unreactive surfaces, thereby enhancing physical contact and chemical bonding. Chemical treatments (such as caustic or ammonia etch) act by chemically modifying the surface layer into a functional group that is more reactive. High energy surface treatments bombard the surface with high energy atoms or molecules. Both chemical etch and high energy surface treatments are known to alter the chemical and the physical nature of the surface.

For use with strong organic solvents as described above and the above-described barrier layer, an oxygen plasma etched polyimide material may be used. Examples of polyimide that may be used are sold under the names of Kapton®, Kaptrex and Upilex®. Surface treatments other than the oxygen plasma etch that may be used for polyimide films include chromium atom bombardment or a caustic etch. Alternatively, gold plated nickel-based orifice plates may be used.

Each of the nozzles 24 is aligned with a respective resistive heater 18 and firing chamber 21. The bonding of the nozzle plate 23 to the ink barrier layer 35 to form the firing chambers 21 is different than the print heads disclosed in U.S. Pat. Nos. 5,907,333; 6,045,214; and, 6,371,600 that integrate the fluidic channels and firing chambers as part of the nozzle plate. In addition, the conductors of the resistive heaters are not integrated with the nozzle plate as disclosed in U.S. Pat. No. 5,291,226.

The nozzle plate 23 may be fabricated from a roll of raw polyimide film that is processed in a serial fashion by passing the film by a mask-guided laser cutting stations to cut/drill the nozzle orifices 24 through the film. The roll of film is then treated by passing through an adhesion promoter bath. Other surface treatments may also be applied to the nozzle plate material. After the film is cleaned and dried, individual nozzle plates are punched from the roll. In general, the nozzle plate materials may be treated when the material is in the roll form or after the individual nozzle plates are formed. However, the time period between treatment and the assembly of the nozzle plate to the print head is preferably minimized to avoid any degradation of material properties.

With respect to an embodiment of the present invention, the array of resistive heaters 18 on the print head 11 and nozzles 24 on the nozzle plate 23 includes two rows/columns that span a distance of about ½" on the print head 11. Depending on the orientation of the print head 11, the nozzles 24 may be arranged in either columns or rows. For purposes of describing an embodiment of the invention and in reference to FIG. 5, the nozzles 24 are arranged in two columns 51 and 52. Each column of the nozzles 24 includes sixty-four nozzles to provide a resolution of two hundred forty drops per inch (“240 dpi”). In each nozzle column 51 and 52, consecutive nozzles 24 are horizontally offset relative to one another. In addition, as represented by the dashed lines 36, the nozzles 24 in column 51 are vertically offset relative to nozzles 24 in the other column 52. In a one half linear inch area centered on the print head 11, each of the columns includes sixty four (64) nozzles. The nozzles in each of the columns may be vertically spaced apart from one another a distance d1 of 1/120". The nozzles 24 in column 51 are vertically offset a distance d2, or 1/240" relative to nozzles 24 in the second column 52 to achieve a vertical dot density of 240 dpi. The print head 11 may generate ink drops having volumes to provide some overlap of adjacent printed dots. For example selected volumes may generate ink dots on a print medium that are about 106 μm to about 150 μm in diameter, with about 125 μm to about 130 μm being a target diameter with a 12 μm overlap between adjacent drops. With these selected volumes, in one embodiment, the maximum frequency at which any one nozzle 20 may fire is about 7.2 kHz, although higher frequencies are possible.

The assembly of the nozzle plate 23 onto the ink barrier layer 35 is similar in some respects to a thermal bonding process disclosed in U.S. Pat. No. 4,953,287. In a first step, the nozzle plate 23 and the barrier layer 35 are optically aligned and tacked together using a thermo-compression process by applying pressure under elevated temperatures at various points of the nozzle plate 23. This may be performed on an individual basis for each nozzle plate 23. Then nozzles plates 23 are again subjected to a thermo-compression process in which constant pressure at elevated temperatures is applied to all areas of the nozzle plate 23 for a predetermined time. This process may be performed on multiple nozzle plates 23 in a single step. The nozzle plate 23 having been secured to the barrier layer 35, the entire print head 11 is subjected to heat at temperatures ranging from about 200° C. to 250° C. for about 2 hours to cure the barrier layer 35.

Adhesion promoters may also be used to improve the bonding between the nozzle plate 23 and the barrier layer 35, and the substrate 14 and the barrier layer 35. The use of adhesion promoters (also known as coupling agents) is a method for improving interfacial adhesion. However it can be challenging to find an adhesion promoter that is effective in a particular application. The surface chemistries of key barrier layer/orifice plate interfaces are considered in selecting a suitable adhesion promoter. The adhesion promoter may be selected from methacrylic silane, chromium methacrylate complex, zircoaluminate, amino silane, mercapto silane, cyano silane, isocyanato silane, tetraalkyl titanate, tetraalkoxy titanate, chlorobenzyl silane, chlorinated polyolefin, dihydroimidazole silane, succinic anhydride silane, vinyl silane, ureido silane, and epoxy silane.

Fabrication of the TAB 10 is now described. The TAB 10 may be fabricated using known processes to form a two or three-layered flex circuit. The three-layered flex circuit includes a polyimide film layer 37, shown in FIG. 9B, laminated to a copper layer 38 by an adhesive layer 39. The polyimide layer 37 is perforated or punched to form the sprocket holes 40 and contact pad holes 41. A photolithography procedure is then applied to the copper layer 38 to form a TAB conductor circuit including the contact pads 42, which establish an electrical connection to a printing system, to the traces 47 and inner leads 43 that establish an electrical connection to the print head 11 circuitry. A solvent-resistant epoxy/novolac, polyimide or methyl methacrylate layer 44 may be screen printed on the copper layers 38 to provide electrical insulation and to protect from chemical attack. Alternatively, a die-cut thermoplastic film such as EAA film may be used to provide electrical insulation and chemical protection as well as to provide a means for attaching the TAB circuit to the snout. The exposed copper areas on the polyimide layer 37 side of the TAB 10 are subjected to gold plating using known plating or electroplating procedures.

For a two-layered TAB 10, shown in FIG. 9A, a tie layer of chromium is deposited using known techniques such as chemical vapor deposition or electroplating on the polyimide layer 37. A copper layer is then electroplated on the chromium and then pattern etched to form a conductor circuit 38. The polyimide layer 37 is then etched after a photolithography mask technique is used to establish the arrangement of the contact holes 41, and the window for the inner leads 43. The insulating/protective layer 44 and gold plating is applied as described above to complete the process. An advantage of the two-layer TAB 10 is that it does not use an adhesive layer, since adhesive layers are subject to being dissolved by organic solvents.

In reference to FIG. 1 the TAB flex circuit 10 includes electrical contact pads 42 and inner leads 43. In addition the conductor circuit also includes peripheral copper-plated bus-bars 45, and electrodes (not shown) routed from the contact pads 42 to the bus-bars 45. At an area adjacent the print head 11, the inner leads 43 are routed from the bus-bars 45 to the bonding pads 48 on the print head 11. In an embodiment, the TAB 10 is seventy millimeters wide so there is sufficient spacing on the TAB 10 to route the electrodes to peripheral bus-bars 45, as is typically done in the fabrication of TAB flex circuits. This conductor layout is different that those layouts that incorporate bridging techniques as a result of crowded conductor layouts as disclosed in U.S. Pat. Nos. 4,944,850; 4,989,317; and, 5,748,209.

An encapsulant may be used to protect the metal leads that connect the TAB flex circuit 10 to the print head. An encapsulant may also be used to protect other areas of the TAB circuit flex circuit 10. The encapsulant should withstand exposure to organic solvents without swelling or loss of adhesion to silicon carbide, gold, copper, and polyimide. In general, the encapsulant material is preferably a snap-cure epoxy-based adhesive system designed for robust chemical resistance and adhesion to engineering plastics and silicon thin films. Emerson & Cuming LA3032-78 is a preferred encapsulant, since it exhibits insignificant swelling when exposed to organic solvent inks and has good adhesion to polyimide. Emerson & Cuming A316-48 or GMT Electronic Chemicals B-1026E may also be used.

The TAB flex circuit 10 may be attached to the snout portion 14 with a hot-melt bonding film, such as one manufactured by 3M Corporation (3M bonding film #406). In one embodiment, the bonding film is used to adhere the polyimide and metal on the TAB flex circuit 10 to the PPS material of the snout portion 14. The bonding film may be a single layer of ethylene acrylic acid copolymer (EAA), and may also serve to provide electrical and chemical protection. A combination of direct heat staking and adhesive may also be used to attach the TAB flex circuit to the snout portion 14.

The print head 11 may be attached to the cartridge housing 13A using an adhesive. The adhesive should be able to withstand exposure to organic solvents, and like the previously-described encapsulant material, may be snap-cure epoxy-based adhesive systems designed for robust chemical resistance and adhesion to engineering plastics and silicon thin films. Emerson & Cuming E-3032 is a suitable adhesive. Other suitable adhesives include Loctite 190794, Loctite 190665, and Master Bond 10HT.

While the preferred embodiments of the present invention have been shown and described herein, it will be obvious that such embodiments are provided by way of example only and not of limitation. Numerous variations, changes and substitutions will occur to those skilled in the art without departing from the teaching of the present invention. Accordingly, it is intended that the invention be interpreted within the full spirit and scope of the appended claims.

What is claimed is:

1. An inkjet printing system, comprising:

a print head in fluid communication with an ink reservoir and having a plurality of orifices and a corresponding plurality of associated ejection chambers, comprising:

a substrate;

a barrier layer disposed on the substrate, the barrier layer defining in part a plurality of fluid channels and the plurality of ejection chambers, where the barrier layer comprises a material selected from epoxy-based photo resist materials and methyl methacrylate-based photo resist materials; and an orifice plate disposed over the substrate, the orifice plate including the plurality of orifices in fluid communication with the ejection chambers, wherein the orifice plate comprises a material selected from polyimides and nickel, wherein the system is capable of storing an organic solvent-based ink for a period of at least six months, wherein any dissolving, delaminating, shrinking, or swelling of print head materials during the period of at least six months does not materially affect the printing performance of the system.

2. The inkjet printing system of claim 1 wherein the organic solvent is selected from MEK, ethanol, acetone, cyclohexanone, and combinations thereof.

3. The inkjet printing system of claim 1 wherein the orifice plate surface is treated with a method selected from $O_2$ plasma treatment, chromium atom bombardment, and caustic etching.

4. The inkjet printing system of claim 1 wherein the barrier layer comprises SU-8 epoxy.

5. The inkjet printing system of claim 1 wherein the barrier layer comprises PerMX epoxy.

6. The inkjet printing system of claim 1 wherein the barrier layer comprises Ordyl acrylic photo resist material.

7. The inkjet printing system of claim 1 further comprising an adhesion promoter disposed between the barrier layer and the orifice plate.

8. The inkjet printing system of claim 7 wherein the adhesion promoter comprises a material selected from methacrylic silane, chromium methacrylate complex, zircoaluminate, amino silane, mercapto silane, cyano silane, isocyanato silane, tetraalkyl titanate, tetraalkoxy titanate, chlorobenzyl silane, chlorinated polyolefin, dihydroimidazole silane, succinic anhydride silane, vinyl silane, ureido silane and epoxy silane.

9. The inkjet printing system of claim 1 further comprising an adhesion promoter disposed between the barrier layer and the substrate.

10. The inkjet printing system of claim 1 wherein the print head is mounted to a portion of a cartridge using an epoxy-based adhesive.

11. The inkjet printing system of claim 10 wherein the epoxy-based adhesive is Emerson & Cuming E3032.

12. The inkjet printing system of claim 1 wherein the print head is disposed on a cartridge, further comprising a tape automated bonding flex circuit disposed on the cartridge.

13. The inkjet printing system of claim 12 wherein the tape automated bonding flex circuit comprises a polyimide based material.

14. The inkjet printing system of claim 12 wherein the tab automated bonding flex circuit is heat staked to the cartridge using a thermoplastic hot melt adhesive.

15. The inkjet printing system of claim 14 wherein the adhesive is selected from EAA and PPS films.

16. The inkjet printing system of claim 12 wherein at least a portion of the tape automated bonding flex circuit is encapsulated with an electronic grade epoxy encapsulant.

17. An inkjet printing system, comprising:

a print head in fluid communication with an ink reservoir and having a plurality of orifices and a corresponding plurality of associated ejection chambers, comprising:

a substrate;

a barrier layer disposed on the substrate, the barrier layer defining in part a plurality of fluid channels and the plurality of ejection chambers, where the barrier layer comprises a material selected from epoxy-based photo resist materials and methyl methacrylate-based photo resist materials; and an orifice plate disposed over the substrate, the orifice plate including the plurality of orifices in fluid communication with the ejection chambers, wherein the orifice plate comprises a material selected from polyimides and nickel, wherein the materials of the system do not significantly dissolve, delaminate, shrink, swell, or otherwise distort when exposed to an organic solvent-based ink for a period of at least six months, wherein the organic solvent is selected from ketones, methyl ethyl ketone, alcohols, ethanol, acetone, cyclohexanone, esters, ethers, polar aprotic solvents, and combinations thereof.

18. The inkjet printing system of claim 17 wherein the organic solvent is selected from MEK, ethanol, acetone, cyclohexanone, and combinations thereof.

19. The inkjet printing system of claim 17 wherein the barrier layer comprises SU-8 epoxy.

20. The inkjet printing system of claim 17 wherein the barrier layer comprises PerMX epoxy.

21. The inkjet printing system of claim 17 wherein the barrier layer comprises Ordyl acrylic photo resist material.

* * * * *